US010654371B2

(12) United States Patent
Kim et al.

(10) Patent No.: US 10,654,371 B2
(45) Date of Patent: May 19, 2020

(54) CHARGING APPARATUS FOR ELECTRIC VEHICLE

(71) Applicants: HYUNDAI MOTOR COMPANY, Seoul (KR); KIA MOTORS CORPORATION, Seoul (KR)

(72) Inventors: Jongpil Kim, Yongin-si (KR); Sihun Yang, Hwaseong-si (KR); JaeEun Cha, Gwangmyeong-si (KR); Woo Young Lee, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 9 days.

(21) Appl. No.: 16/169,145

(22) Filed: Oct. 24, 2018

(65) Prior Publication Data
US 2019/0291586 A1 Sep. 26, 2019

(30) Foreign Application Priority Data
Mar. 21, 2018 (KR) .................. 10-2018-0032693

(51) Int. Cl.
| H02M 7/5387 | (2007.01) |
| H02M 1/42 | (2007.01) |
| H02M 1/44 | (2007.01) |
| B60L 53/20 | (2019.01) |
| B60L 50/51 | (2019.01) |
| B60L 53/10 | (2019.01) |

(52) U.S. Cl.
CPC .............. *B60L 53/20* (2019.02); *B60L 50/51* (2019.02); *B60L 53/11* (2019.02); *H02M 1/4233* (2013.01); *H02M 1/44* (2013.01); *H02M 7/5387* (2013.01); *B60L 2210/40* (2013.01)

(58) Field of Classification Search
CPC .............. B60L 11/1811; B60L 11/1803; B60L 2210/40; B60L 11/185; H02M 7/5387; H02M 1/44; H02M 1/4233
USPC ......................................................... 320/109
See application file for complete search history.

(56) References Cited

U.S. PATENT DOCUMENTS

| 9,493,080 B2 | 11/2016 | Kvieska et al. |
| 2010/0006356 A1* | 1/2010 | Curry et al. .............. B60L 8/00 180/65.8 |
| 2010/0080022 A1 | 4/2010 | Schmidt |
| 2012/0300515 A1* | 11/2012 | Carletti et al. ...... H02M 1/4225 363/74 |
| 2019/0291585 A1* | 9/2019 | Yang et al. ............. H02P 27/06 |

(Continued)

*Primary Examiner* — Sun J Lin
(74) *Attorney, Agent, or Firm* — Brinks Gilson & Lione

(57) ABSTRACT

A charging apparatus for an electric vehicle has a small-sized simple structure, and charges a battery of the electric vehicle upon receiving electricity from various kinds of power sources. The charging apparatus includes a motor, an inverter, an AC power input stage, a power factor, a link capacitor, a switch network, and a controller. The AC power input stage receives an AC input power from a single-phase AC power or a multi-phase AC power. The power factor corrector has a single three-leg half bridge circuit receiving the AC input power through the AC power input stage, and the link capacitor is charged through at least one of combinations of the power factor corrector, the motor, and the inverter. The controller controls the power factor corrector and the switch network based on a condition of AC input power received through the AC power input stage.

21 Claims, 13 Drawing Sheets

(56) References Cited

U.S. PATENT DOCUMENTS

2019/0291586 A1* 9/2019 Kim et al. ............. H02M 1/44
2019/0299792 A1* 10/2019 Kim et al. .......... H02M 1/4233
2019/0299793 A1* 10/2019 Kim et al. ............. H02J 7/022

* cited by examiner

CHARGING APPARATUS FOR ELECTRIC VEHICLE

CROSS-REFERENCE TO RELATED APPLICATION

This application claims priority to and the benefit of Korean Patent Application No. 10-2018-0032693, filed on Mar. 21, 2018, the entire contents of which are incorporated herein by reference.

FIELD

The present disclosure relate to a vehicle, and more particularly to a charging apparatus for an electric vehicle configured to travel using power of a motor.

BACKGROUND

The statements in this section merely provide background information related to the present disclosure and may not constitute prior art.

An internal combustion vehicle is designed to obtain main energy by burning fossil fuels, whereas an electric vehicle uses electricity as a main energy source. Therefore, it is desired for the electric vehicle to include a high-voltage battery to store electric energy therein, a motor to generate power, and an inverter to drive the motor.

A charger for charging a battery of the electric vehicle may be classified into a slow-speed charger and a high-speed charger. The slow-speed charger may transmit commercial AC power to a vehicle without change. The high-speed charger may convert commercial AC power into DC power, and may transmit the DC power to the vehicle. The slow-speed charger has a simplified structure and is inexpensive, such that the slow-speed charger can be easily developed and rapidly become widespread. However, in order to use the slow-speed charger, an On Board Charger (OBC) needs to be mounted to the electric vehicle.

There are various kinds of AC powers provided through the slow-speed charger according to individual countries in which slow-speed chargers are used. In order to charge a battery of the electric vehicle using various kinds of AC powers, it is desired for On Board Chargers (OBCs) to cope with various kinds of AC power.

As a battery of the electric vehicle has higher capacity, a range of the electric vehicle provided with the battery also increases. Therefore, many developers and vehicle companies are conducting intensive research on technology for increasing battery capacity of electric vehicles. However, charging time of a large-capacity battery unavoidably increases. We have discovered that if the OBC capacity increases, the charging time of the large-capacity battery decreases and that the increasing OBC capacity may unavoidably increase the size of constituent elements of the electric vehicle and production costs of the electric vehicle.

SUMMARY

The present disclosure provides a charging apparatus for an electric vehicle, which has a small and simple structure, and charges a battery of an electric vehicle upon receiving electricity from various kinds of power sources.

Additional aspects of the present disclosure will be set forth in part in the description which follows and, in part, will be obvious from the description, or may be learned by practice of the present disclosure.

In one form of the present disclosure, a charging apparatus for an electric vehicle includes: a motor, an inverter, an AC power input stage, a power factor, a link capacitor, a switch network, and a controller. The motor generates power needed to drive the electric vehicle. The inverter provides power to the motor. The AC power input stage receives at least one AC input power from one of single-phase AC power or multi-phase AC power. The power factor corrector has a single three-leg half bridge circuit receiving the AC input power through the AC power input stage. The link capacitor is charged through at least one of combinations of the power factor corrector, the motor, and the inverter. The switch network includes not only a first switch S1 for connecting any one of an AC power input line and a neutral line of the AC power input stage to the power factor corrector, but also at least one second switch for selectively connecting the AC power input stage to the power factor corrector, the link capacitor, the motor, or the inverter. The controller controls the power factor corrector and the switch network based on a condition of AC input power received through the AC power input stage.

The first switch may be provided to the AC power input stage, and may be turned on or off so as to cope with a multi-phase or single-phase condition of the AC input power.

The switch network may further include a third switch including, an one end connected to a neutral point of the motor.

The switch network may further include a fourth switch to be switched in a manner that at least one leg of the power factor corrector is connected to the AC power input stage or other end of the third switch.

The switch network may further include a fifth switch disposed between the power factor corrector and the link capacitor.

The switch network may further include a sixth switch and a seventh switch. In particular, the sixth switch is disposed between both ends (i.e., first and second ends) of the link capacitor, and the seventh switch is disposed between both ends (i.e., first and second ends) of a converter.

A first leg of the power factor corrector may be connected to a first AC power input line of the AC power input stage. A second leg of the power factor corrector may be connected to a second AC power input line or a neutral line of the AC power input stage through the first switch. A third leg of the power factor corrector may be connected to a third AC power input line of the AC power input stage or the third switch through the fourth switch.

The condition of the AC input power may include a multi-phase condition and a single-phase condition of the AC input power.

The condition of the AC input power may include a symmetric power condition and an asymmetric power condition of the AC input power.

In accordance with another aspect of the present disclosure, a charging apparatus for an electric vehicle includes: a motor configured to generate power needed to drive the electric vehicle; an inverter configured to supply power to the motor; an alternating current (AC) power input stage configured to receive AC input power from one of single-phase AC power or multi-phase AC power; a power factor corrector having a single three-leg half bridge circuit configured to receive the AC input power through the AC power input stage; a link capacitor to be charged through at least one of combinations of the power factor corrector, the motor, and the inverter; a switch network having not only a first switch S1 for connecting an AC power input line or a neutral line of the AC power input stage to the power factor corrector, but a second switch for selectively connecting the AC power input stage to the power factor corrector, the link capacitor, the motor, or the inverter; and a controller configured to control the power factor corrector and the switch network based on a condition of AC input power received through the AC power input stage. The switch network further includes a third switch including one end connected to a neutral point of the motor, and a fourth switch configured to connect at least one leg of the power factor corrector to the AC power input stage or other end of the third switch.

The first switch may be provided to the AC power input stage, and may be turned on or off so as to cope with a multi-phase or single-phase condition of the AC input power.

The switch network may further include a fifth switch disposed between the power factor corrector and the link capacitor.

The switch network may further include a sixth switch and a seventh switch respectively disposed between two ends of the link capacitor and between two ends of a converter.

A first leg of the power factor corrector may be connected to a first AC power input line of the AC power input stage. A second leg of the power factor corrector may be connected to a second AC power input line or a neutral line of the AC power input stage through the first switch. A third leg of the power factor corrector may be connected to a third AC power input line of the AC power input stage or the third switch through the fourth switch.

The condition of the AC input power may include a multi-phase condition and a single-phase condition of the AC input power.

The condition of the AC input power may include a symmetric power condition and an asymmetric power condition of the AC input power.

In other form of the present disclosure, a charging apparatus for an electric vehicle includes: a motor configured to generate power to drive the electric vehicle; an inverter configured to supply power to the motor; an alternating current (AC) power input stage configured to receive at least one AC input power from one of single-phase AC power or multi-phase AC power; a power factor corrector having a single three-leg half bridge circuit configured to receive the AC input power through the AC power input stage; a link capacitor to be charged through at least one of combinations of the power factor corrector, the motor, and the inverter; a switch network having not only a first switch S1 for connecting any one of an AC power input line and a neutral line of the AC power input stage to the power factor corrector, but also a second switch for selectively connecting the AC power input stage to the power factor corrector, the link capacitor, the motor, or the inverter; and a controller configured to control the power factor corrector and the switch network based on a condition of AC input power received through the AC power input stage. The switch network may further include a third switch having an end connected to a neutral point of the motor, a fourth switch to connect at least one leg of the power factor corrector to any one of the AC power input stage and other end of the third switch, a fifth switch disposed between the power factor corrector and the link capacitor, and a sixth switch and a seventh switch respectively disposed between first and second ends of the link capacitor and between first and second ends of a converter.

The first switch may be provided to the AC power input stage, and may be turned on or off so as to cope with a multi-phase or single-phase condition of the AC input power.

A first leg of the power factor corrector may be connected to a first AC power input line of the AC power input stage. A second leg of the power factor corrector may be connected to any one of a second AC power input line and a neutral line of the AC power input stage through the first switch. A third leg of the power factor corrector may be connected to any one of a third AC power input line of the AC power input stage and the third switch through the fourth switch.

The condition of the AC input power may include a multi-phase condition and a single-phase condition of the AC input power.

The condition of the AC input power may include a symmetric power condition and an asymmetric power condition of the AC input power.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
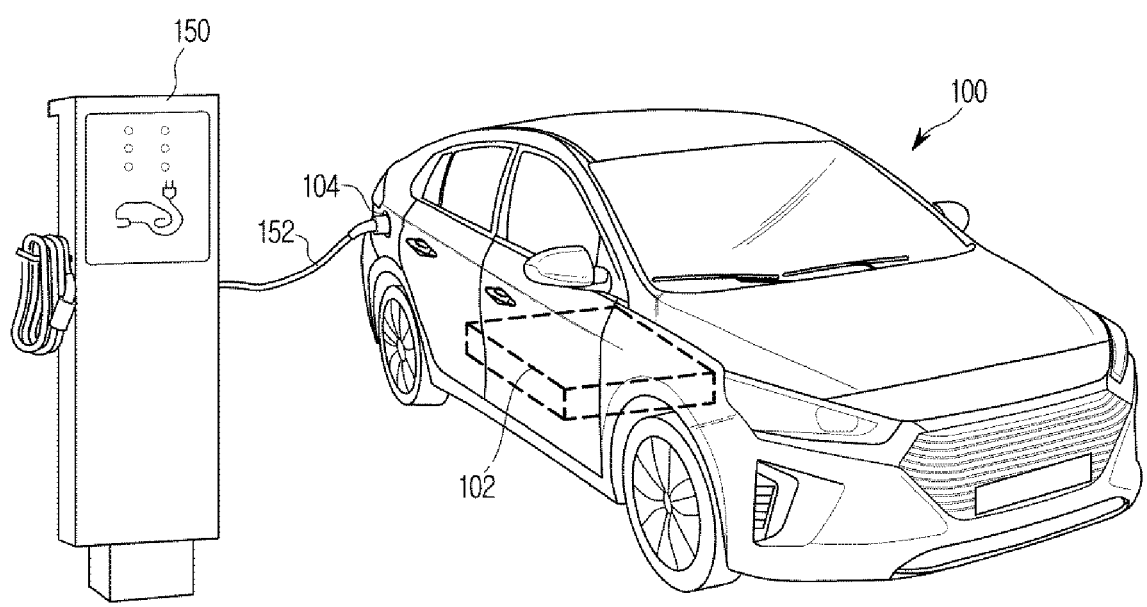
FIG. 1 is a view illustrating the appearance of an electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating the appearance of an electric vehicle 100 in one form of the present disclosure.

Figure 2:
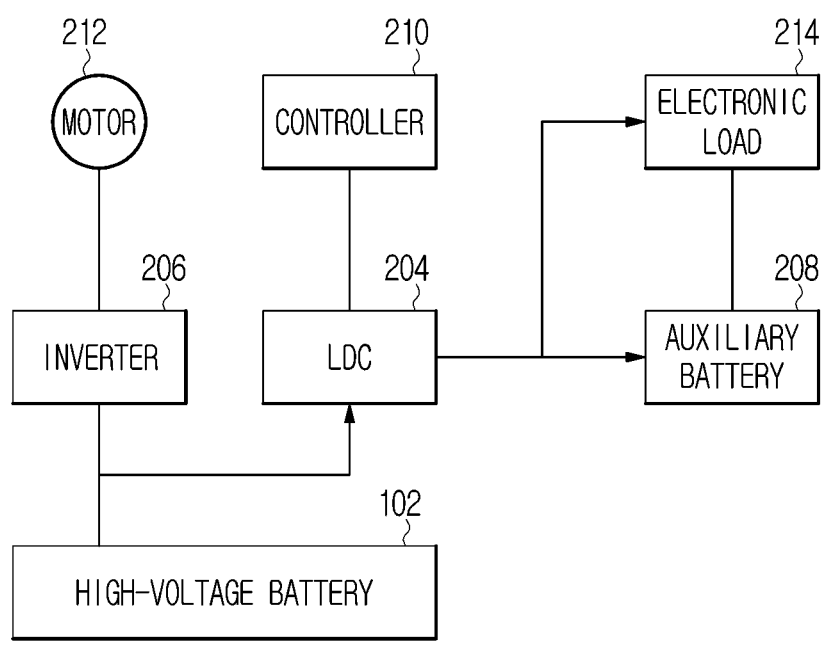
FIG. 2 is a block diagram illustrating a power-supply device for an electric vehicle.

Referring to FIG. 1, the electric vehicle 100 may include a motor 212 (see FIG. 2). Therefore, the electric vehicle 100 may further include a high-voltage battery 102 configured to store power to be used for driving the motor 212. An auxiliary battery 208 (see FIG. 2) may also be provided to a general internal combustion vehicle. However, a large high-capacity high-voltage battery 212 is needed for the electric vehicle 100 whereas an auxiliary battery 208 (see FIG. 2) is provided at one side of an engine compartment of a general internal combustion vehicle. In the electric vehicle 100, a battery 102 is installed at a lower space of a rear passenger seat. Power stored in the battery 102 may be used to generate power by driving the motor 212 (see FIG. 2). The battery 102 in one form may be a lithium battery.

The electric vehicle 100 may be equipped with a charging socket 104 acting as a charging inlet. A charging connector 152 of an external slow-speed charger 150 may be connected to the charging socket 104, such that the high-voltage battery 102 can be charged with electricity or power. That is, when the charging connector 152 of the slow-speed charger 150 is connected to the charging socket 104 of the electric vehicle 100, the high-voltage battery 102 of the electric vehicle 100 can be charged with electricity or power.

FIG. 2 is a block diagram illustrating a power-supply device of the electric vehicle in one form of the present disclosure. The power-supply device shown in FIG. 2 may be configured to supply power to the motor 212 and electronic loads 214.

Referring to FIG. 2, the power-supply device of the electric vehicle 100 may include a high-voltage battery 102, a low-voltage DC-DC converter (LDC) 204, an inverter 206, an auxiliary battery 208, and a controller 210.

The LDC 204 may convert a high DC voltage received from the high-voltage battery 102 into a lower-voltage direct current (DC). The LDC 204 may convert a high DC voltage of the high-voltage battery 102 into an alternating current (AC), may step up (boost) the alternating current (AC) using coils, a transformer, a capacitor, etc., may rectify the boosted AC, and may then convert the rectified AC into a lower-voltage direct current (DC). The direct current (DC) boosted by the LDC 204 may be supplied to individual electronic loads 214 requesting a low voltage.

The DC voltage of the high-voltage battery 102 may be converted into an AC voltage having a predetermined phase and frequency through the inverter 206, such that the resultant AC voltage may be supplied to the motor 212. A rotational force and speed of the motor 212 may be decided by an output voltage of the inverter 206. The controller 210 may control overall operation of the power supply device.

Figure 3:
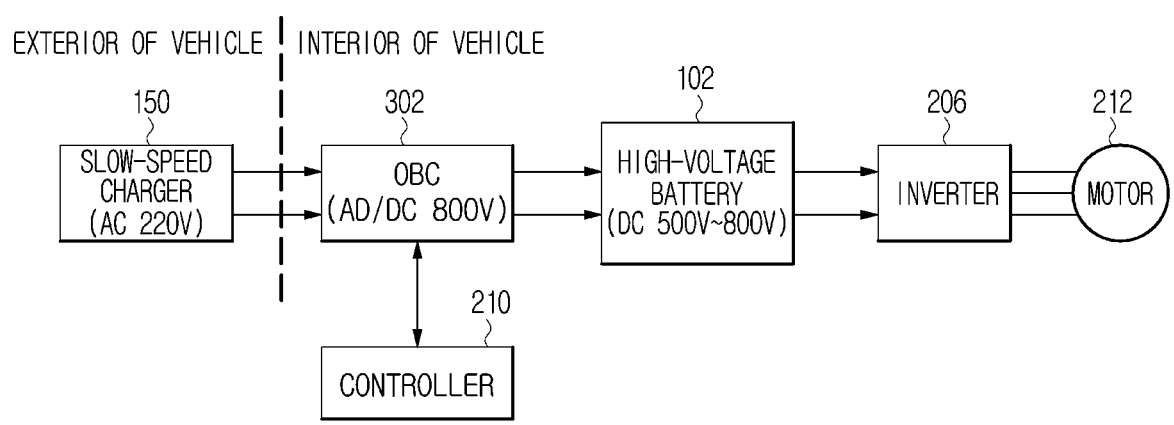
FIG. 3 is a block diagram illustrating a charging apparatus for an electric vehicle.

FIG. 3 is a block diagram illustrating a charging apparatus for the electric vehicle in one form of the present disclosure.

Referring to FIG. 3, a slow-speed charger 150 may be used to charge the high-voltage battery 102. The high-voltage battery 102 may have a charging voltage of 500V~800V. The slow-speed charger 150 may supply AC power to the electric vehicle 100 without change. The AC power supplied through the slow-speed charger 150 may be converted into a predetermined DC voltage by the electric vehicle 100.

An On Board Charger (OBC) 302 embedded in the electric vehicle 100 may be used to charge the high-voltage battery 102. The OBC 302 may convert AC power supplied from the slow-speed charger 150 into a DC voltage of 800V, and may charge the high-voltage battery 102 with the DC voltage of 800V. The slow-speed charger 150 may supply AC power to the electric vehicle 100 without change. The AC voltage supplied through the slow-speed charger 150 may be converted into a DC voltage by the OBC 302, and may be used to charge the high-voltage battery 102.

Figure 4:
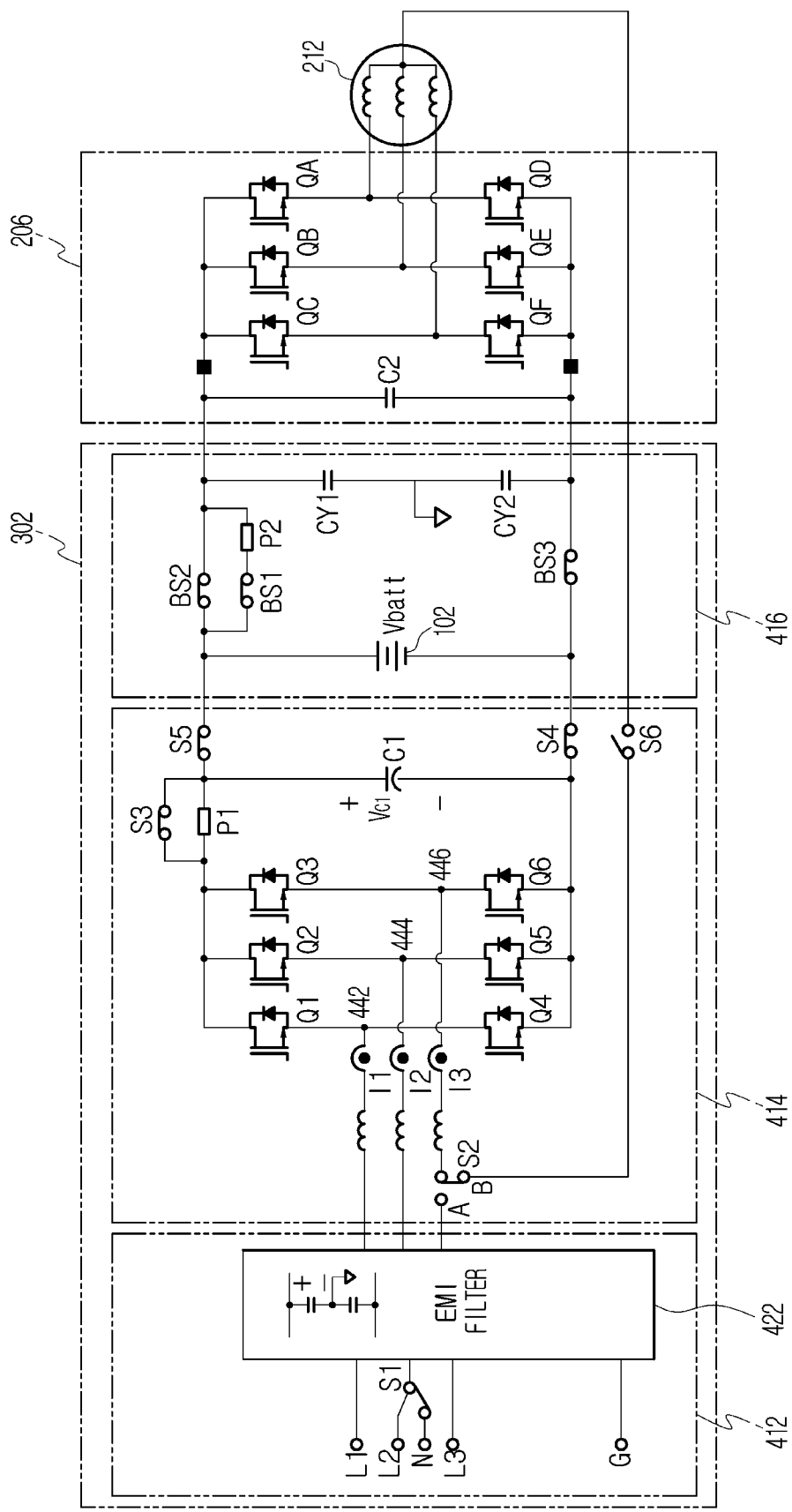
FIG. 4 is a circuit diagram illustrating an On Board Charger (OBC)

FIG. 4 is a circuit diagram illustrating the On Board Charger (OBC) 302 in one form of the present disclosure. FIG. 4 illustrates how the OBC 302 is connected to the high-voltage battery 102, the inverter 206, and the motor 212.

Referring to FIG. 4, the OBC 302 may include an input part 412, a boost power factor corrector 414, and a power relay assembly 416.

The input part 412 may receive AC power from an external AC power source. The input part 412 may include 5 input lines L1, L2, L3, N, and G, an EMI (Electro Magnetic Interference) filter 422, and a switch S1.

The EMI filter 422 may remove noise included in the received AC power. The EMI filter 422 may be connected to the five input lines L1, L2, L3, N, and G. AC power may be input from the external AC power source to the EMI filter 422 through the input lines L1, L2, L3, N, and G. Here, L1, L2, and L3 may be AC power input lines, N is a neutral line, and G is a ground line.

A maximum of three-phase AC power may be input to the EMI filter 422 through the AC power input lines L1, L2 and L3 from among the five input lines L1, L2, L3, N, and G. That is, three-phase AC power may be input to the EMI filter 422 through all of the AC power input lines L1, L2, and L3. Alternatively, bi-phase AC power may be input to the EMI filter 422 only through the AC power input lines L1 and L2, or single-phase AC power may be input to the EMI filter 422 only through the AC power input line L1 and the neutral line N.

The switch S1 of the input part 412 may connect any one of the AC power input line L2 and the neutral line N to the EMI filter 422. If the input AC power is three-phase AC power or bi-phase AC power, the switch S1 may be controlled in a manner that the AC power input line L2 is connected to the EMI filter 422. If the input AC power is single-phase AC power, the switch S1 may be controlled in a manner that the neutral line N is connected to the EMI filter 422.

The boost power factor corrector 414 may basically include a 3-leg half bridge circuit composed of switching elements Q1, Q2, Q3, Q4, Q5, and Q6. The first leg 442 disposed between the switching elements Q1 and Q4, the second leg 444 disposed between the switching elements Q2 and Q5, and the third leg 446 disposed between the switching elements Q3 and Q6 may be connected to the EMI filter 422. The first leg 441 may detect a phase current I1 that is transmitted from the EMI filter 422 to the half bridge circuit of the boost power factor corrector 414. The second leg 444 may detect a phase current I2 that is transmitted from the EMI filter 422 to the half bridge circuit of the boost power factor corrector 414. The third leg 446 may detect a phase current I3 that is transmitted from the EMI filter 422 to the half bridge circuit of the boost power factor corrector 414. Each of the first to third legs 442, 444, and 446 may include an inductor component.

The switch S2 may be disposed between an output terminal of the EMI filter 422 and the third leg 446 disposed between the switching elements Q3 and Q6 from among three legs 442, 444, and 446. The switch S2 may be controlled in a manner that the leg 446 of the 3-leg half bridge circuit is connected to any one of the output terminal of the EMI filter 422 and a neutral point of the motor 212. That is, the switch S2 may connect the leg 446 of the 3-leg half bridge circuit to the neutral point of the motor 212, or may connect the leg 446 of the 3-leg half bridge circuit to the output terminal of the EMI filter 422. The other switch S6 may be disposed between the switch S2 and the neutral point of the motor 212. Therefore, when the switch S2 is controlled to connect the neutral point of the motor to the third leg 446 of the 3-leg half bridge circuit, the leg 446 of the 3-leg half bridge circuit can be electrically connected to the neutral point of the motor 212 only when the other switch S2 is turned on.

A capacitor C1 acting as a PFC link capacitor may be provided in the boost power factor corrector 414. The capacitor C1 may be disposed between both ends of the half bridge circuit.

Switches S3, S4, and S5 may be further included in the boost power factor corrector 414. The switch S3 may be disposed between an upper end of the half bridge circuit and a positive (+) electrode of the capacitor C1, and may also be connected in parallel to a power factor correction element P1. The remaining two switches S4 and S5 may be respectively disposed at both ends of the capacitor C1, and may electrically interconnect the boost power factor corrector 414 and the power relay assembly 416 to be described. That is, the boost power factor corrector 414 may be electrically connected to the power relay assembly 416 through the switches S4 and S5. The boost power factor corrector 414 may also be electrically connected to both ends of the high-voltage battery 102 through the switches S4 and S5.

Capacitors CY1 and CY2, each of which acts as an equivalent modeling capacitor Y, may be connected in series to the power relay assembly 416. A node through which the capacitors CY1 and CY2 are interconnected may be grounded.

Two switches BS1 and BS2 and a single power factor element P2 may be disposed between the capacitor CY1 and the positive (+) electrode of the high-voltage battery 102. The switch BS1 and the power factor element P1 may be connected in series between the capacitor CY1 and the positive (+) electrode of the high-voltage battery 102, and the switch BS2 may be connected in parallel to this serial connection structure.

The switch BS3 may be disposed between the capacitor CY2 and a negative (−) electrode of the high-voltage battery 102.

The inverter 206 may include six switching elements QA, QB, QC, QD, QE, and QF. A current generated by the switching elements QC and QF, a current generated by the switching elements QB and QE, and a current generated by the switching elements QA and QD may be respectively transmitted to three-phase coils of the motor 212.

The plurality of switches S1, S2, S3, S4, S5, S6, BS1, BS2, and BS3 included in the switch network provided in the OBC 302 may be controlled by the controller 210 shown in FIGS. 2 and 3, and may be turned on or off. In one form of the present disclosure, the high-voltage battery 102 may be charged with various kinds of AC powers through various on/off combinations of the plurality of switches S1, S2, S3, S4, S5, S6, BS1, BS2, and BS3 included in the switch network. Various kinds of AC powers will hereinafter be described with reference to FIG. 5.

Turn-on operation and turn-off operation of the switches S1, S2, S3, S4, S5, S6, BS1, BS2, and BS3 shown in FIG. 4 may be controlled by the controller 210, and turn-on operation and turn-off operation of the switching elements Q1, Q2, Q3, Q4, Q5, Q6, QA, QB, QC, QD, QE, and QF shown in FIG. 4 may also be controlled by the controller 210.

Figure 5:
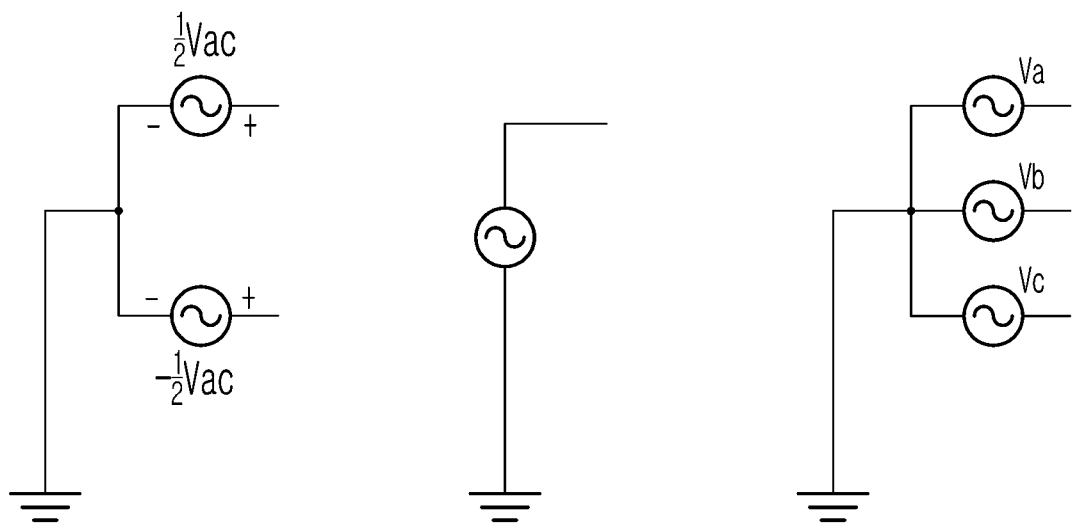
FIG. 5 is a view illustrating various kinds of power sources embedded in the OBC.

FIG. 5 is a view illustrating various kinds of power sources embedded in the OBC in one form of the present disclosure.

FIG. 5(I) is a view illustrating a bi-phase symmetric power source. Referring to FIG. 5(I), the bi-phase symmetric power source may allow a power-supply voltage to be divided into two voltages ½ Vac and −½ Vac. Since two voltages ½Vac and −½Vac may have opposite phases, the two voltages may be referred to as a bi-phase symmetric power source. The bi-phase symmetric power source shown in FIG. 5(I) is mainly used in North America.

FIG. 5(II) is a view illustrating a single-phase asymmetric power source. Referring to FIG. 5(II), the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 5(II) is mainly used in Korea, North America, and Europe.

FIG. 5(III) is a view illustrating a three-phase symmetric power source. Referring to FIG. 5(III), the three-phase asymmetric power source may allow a power-supply voltage to be divided into three voltages Va, Vb, and Vc. Since three voltages Va, Vb, and Vc may have different phases, the three voltages may be referred to as a three-phase asymmetric power source. The three-phase asymmetric power source shown in FIG. 5(III) is mainly used in Europe.

Various kinds of AC power sources are used in individual countries as described above, such that the OBC 302 aims to cope with various kinds of AC powers of the individual counties through the on/off combinations of the switch network. For example, for the bi-phase symmetric power source, a boost power factor corrector formed in a single-phase full bridge inverter type is implemented, such that the high-voltage battery 102 may be charged with power. For the single-phase asymmetric power source, a boost power factor corrector formed in a single-phase full bridge inverter type is implemented, such that the high-voltage battery 102 may also be charged with power. For the three-phase symmetric power source, the three-leg boost power factor corrector is implemented along with a motor/inverter buck converter, such that the high-voltage battery 102 may be charged.

FIGS. 6 to 13 are views illustrating on/off combinations of a switch network coping with various kinds of AC power sources for use in various countries.

Figure 6:
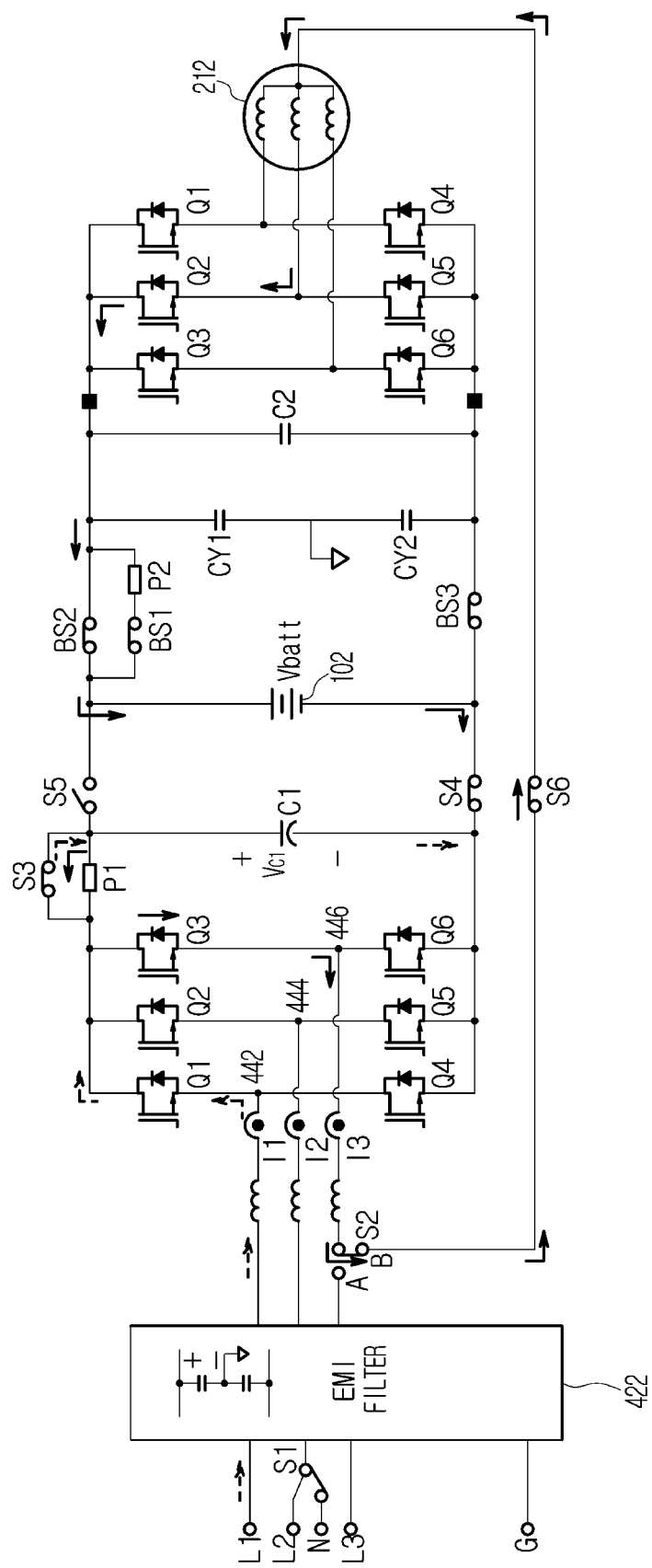
FIGS. 6 and 7 are views illustrating on/off combinations of a switch network coping with bi-phase symmetrical power source for use in North America.
Figure 7:
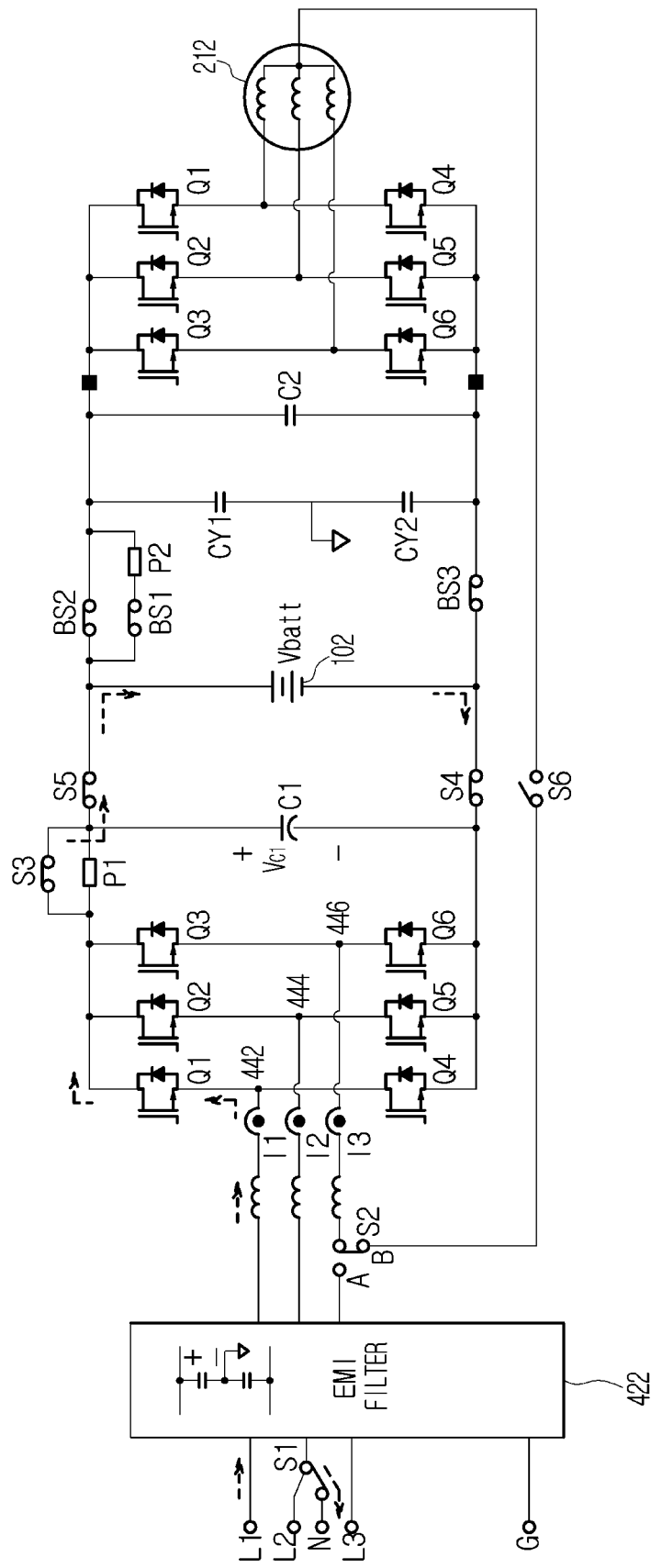

FIGS. 6 and 7 are views illustrating on/off combinations of a switch network coping with a bi-phase symmetrical power source for use in North America. Specifically, FIG. 6 is a view illustrating a method for controlling the switch network when a peak value of a voltage (Vc1) of the capacitor C1 is higher than a charge request voltage (Vbatt) of the high-voltage battery 102. FIG. 7 is a view illustrating a method for controlling the switch network when a peak value of the voltage (Vc1) of the capacitor C1 is lower than the charge request voltage (Vbatt) of the high-voltage battery 102.

Figure 8:
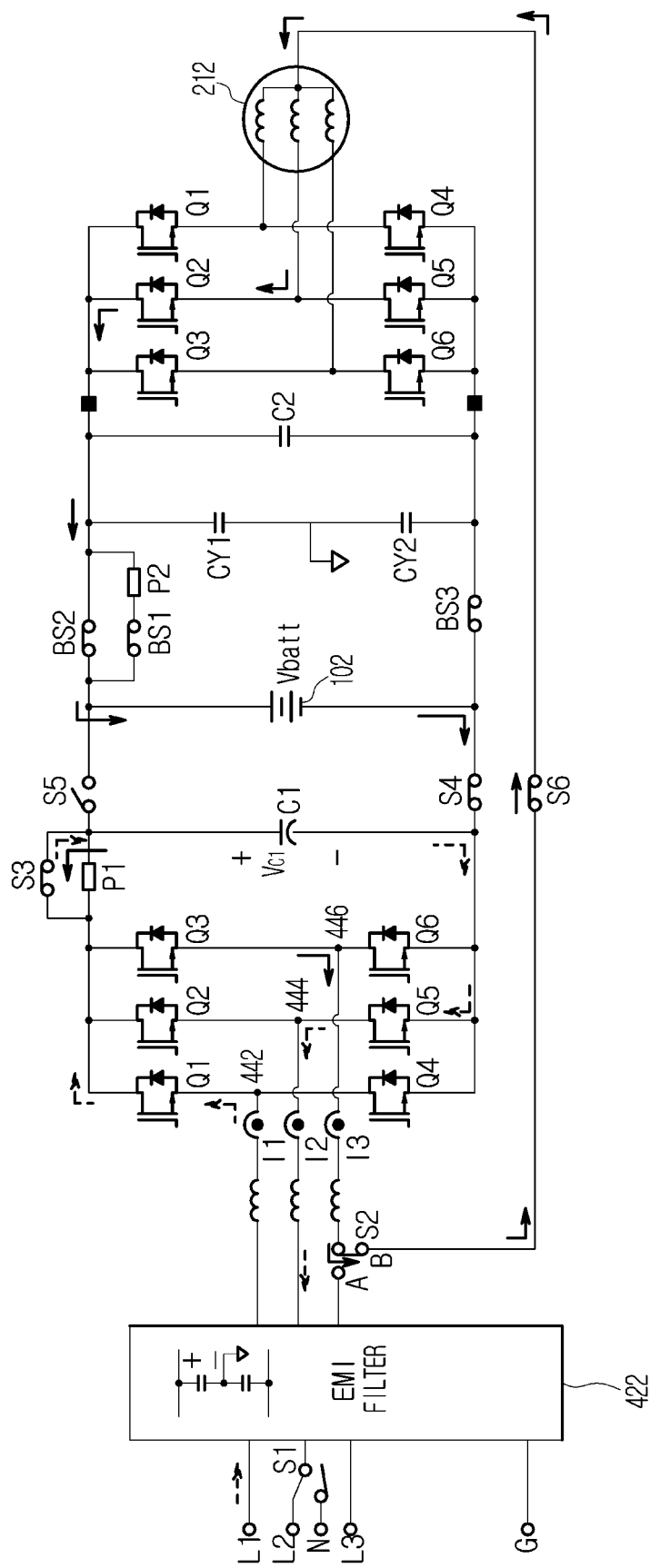
FIGS. 8 and 9 are views illustrating on/off combinations of a switch network coping with three-phase symmetrical power source for use in Europe.
Figure 9:
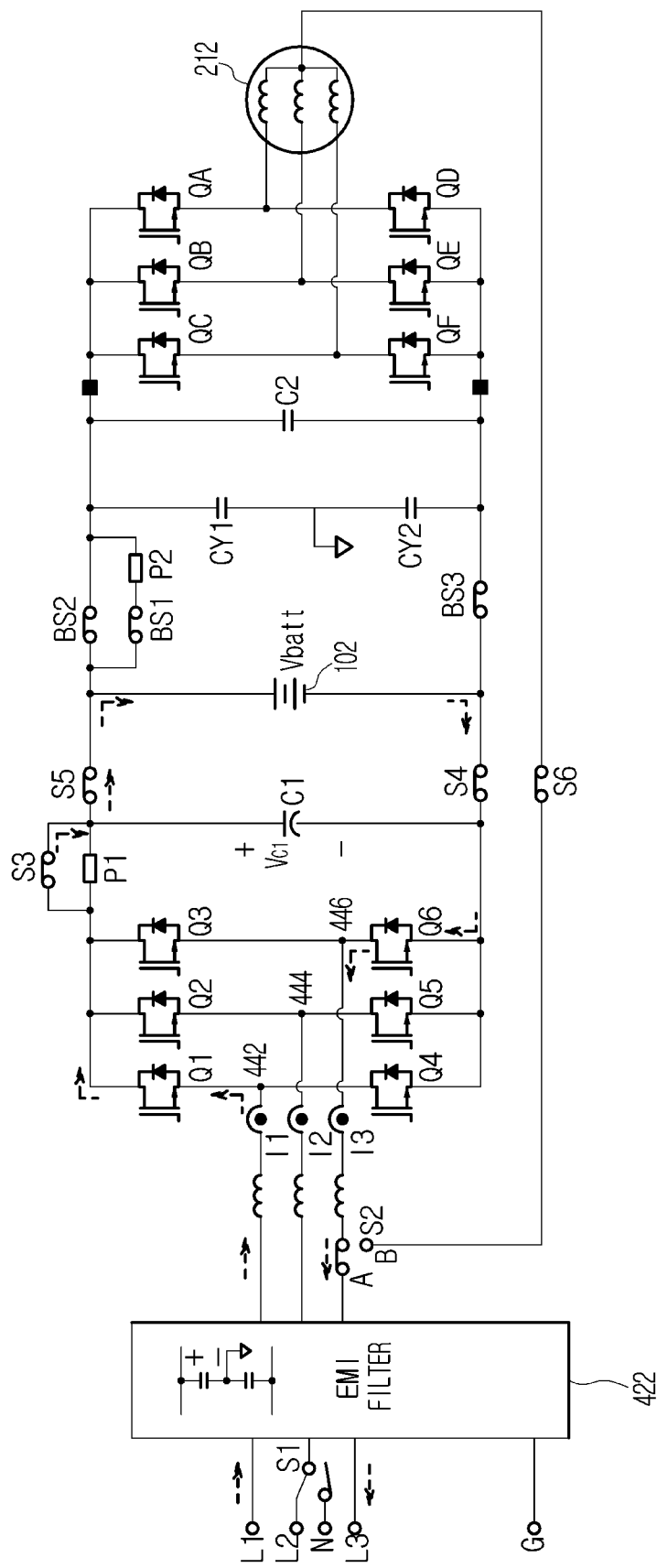

FIGS. 8 and 9 are views illustrating on/off combinations of the switch network coping with three-phase symmetrical power source for use in Europe. Specifically, FIG. 8 is a view illustrating a method for controlling the switch network when a peak value of the voltage (Vc1) of the capacitor C1 is higher than the charge request voltage (Vbatt) of the high-voltage battery 102. FIG. 9 is a view illustrating a method for controlling the switch network when a peak value of the voltage (Vc1) of the capacitor C1 is lower than the charge request voltage (Vbatt) of the high-voltage battery 102.

Figure 10:
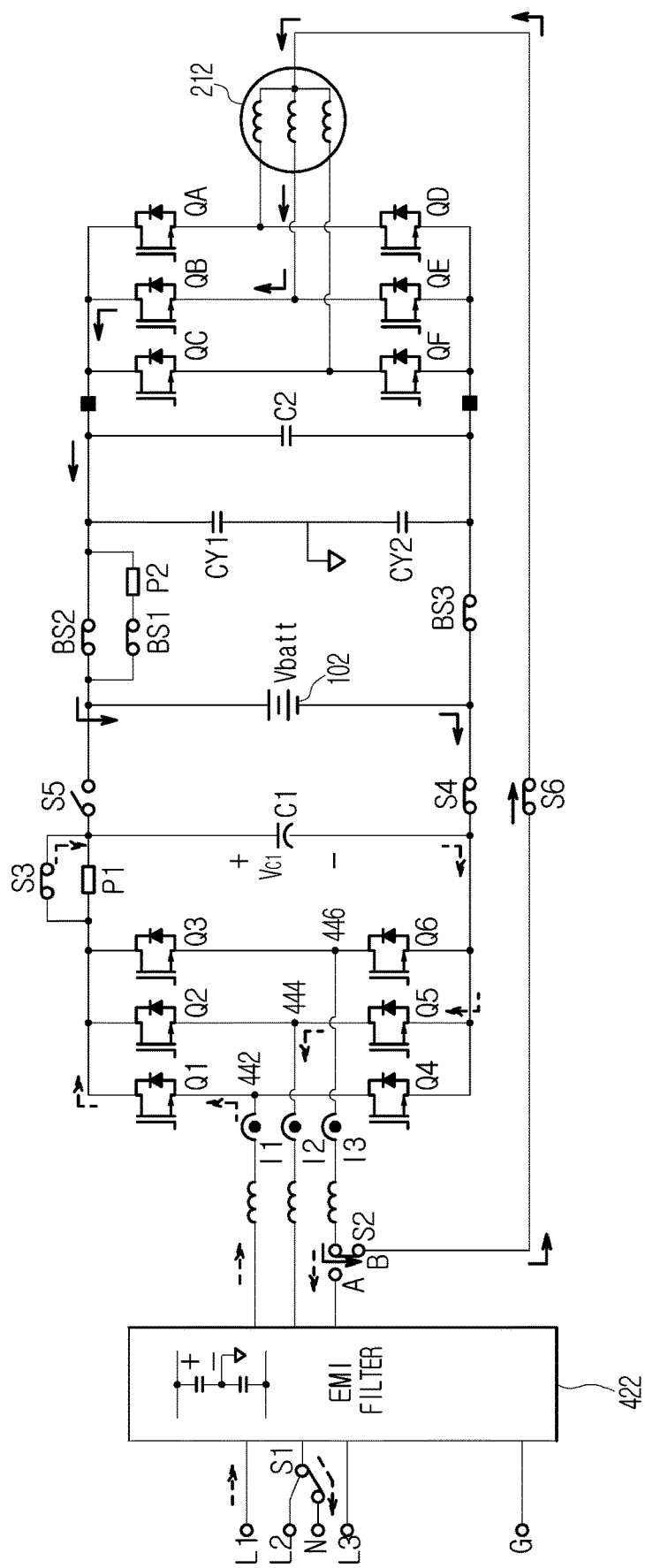
FIGS. 10 and 11 are views illustrating on/off combinations of a switch network coping with single-phase asymmetrical power source for use in Korea and Europe.
Figure 11:
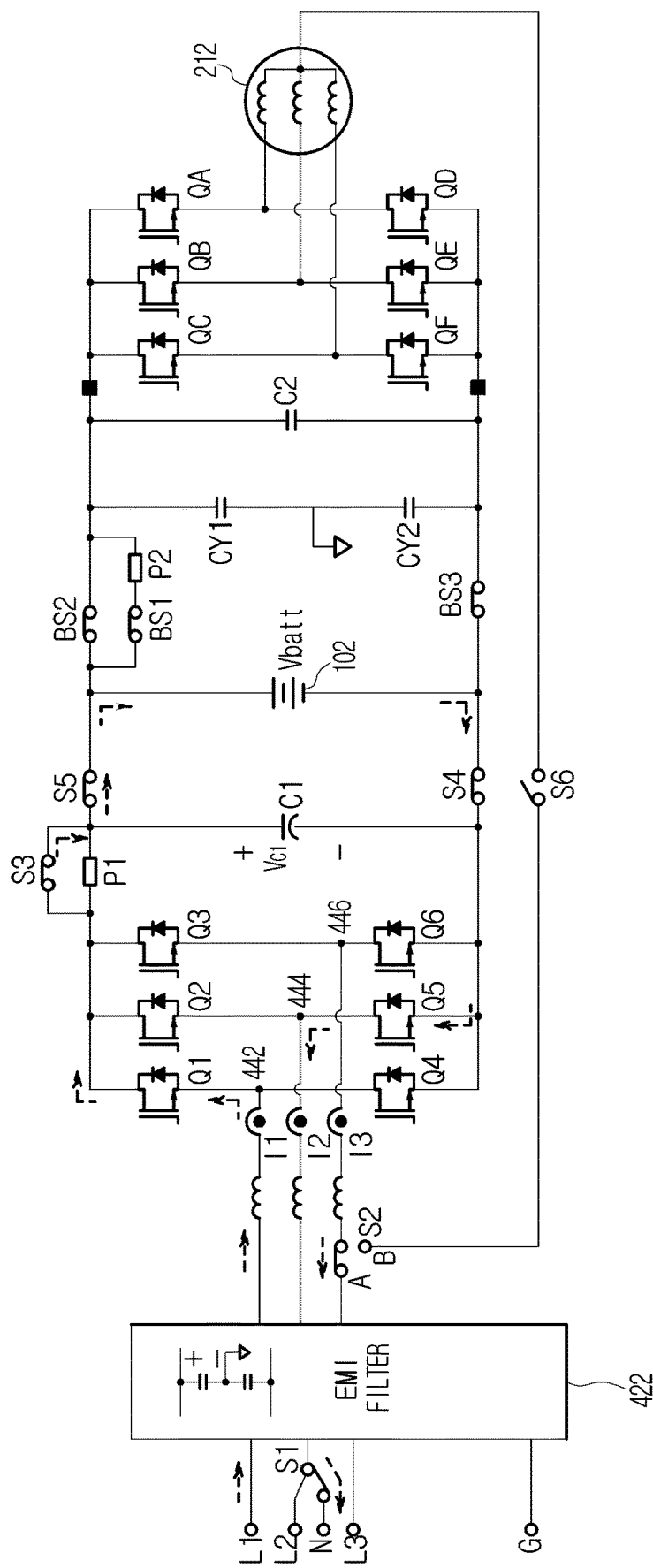

FIGS. 10 and 11 are views illustrating on/off combinations of the switch network coping with a single-phase asymmetrical power source for use in Korea and Europe. Specifically, FIG. 10 is a view illustrating a method for controlling the switch network when a peak value of the voltage (Vc1) of the capacitor C1 is higher than the charge request voltage (Vbatt) of the high-voltage battery 102. FIG. 11 is a view illustrating a method for controlling the switch network when a peak value of the voltage (Vc1) of the capacitor C1 is lower than the charge request voltage (Vbatt) of the high-voltage battery 102.

Figure 12:
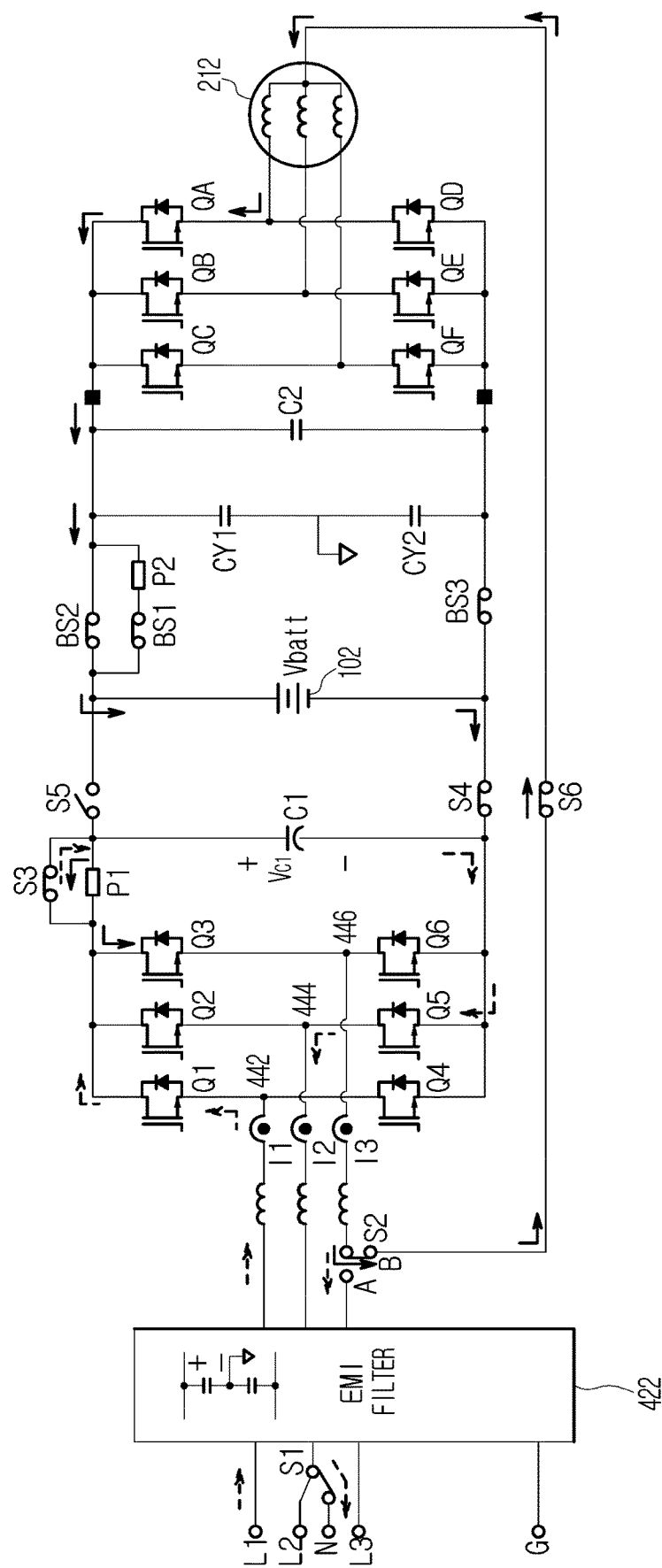
FIGS. 12 and 13 are views illustrating on/off combinations of a switch network coping with single-phase asymmetrical power source for use in North America.
Figure 13:
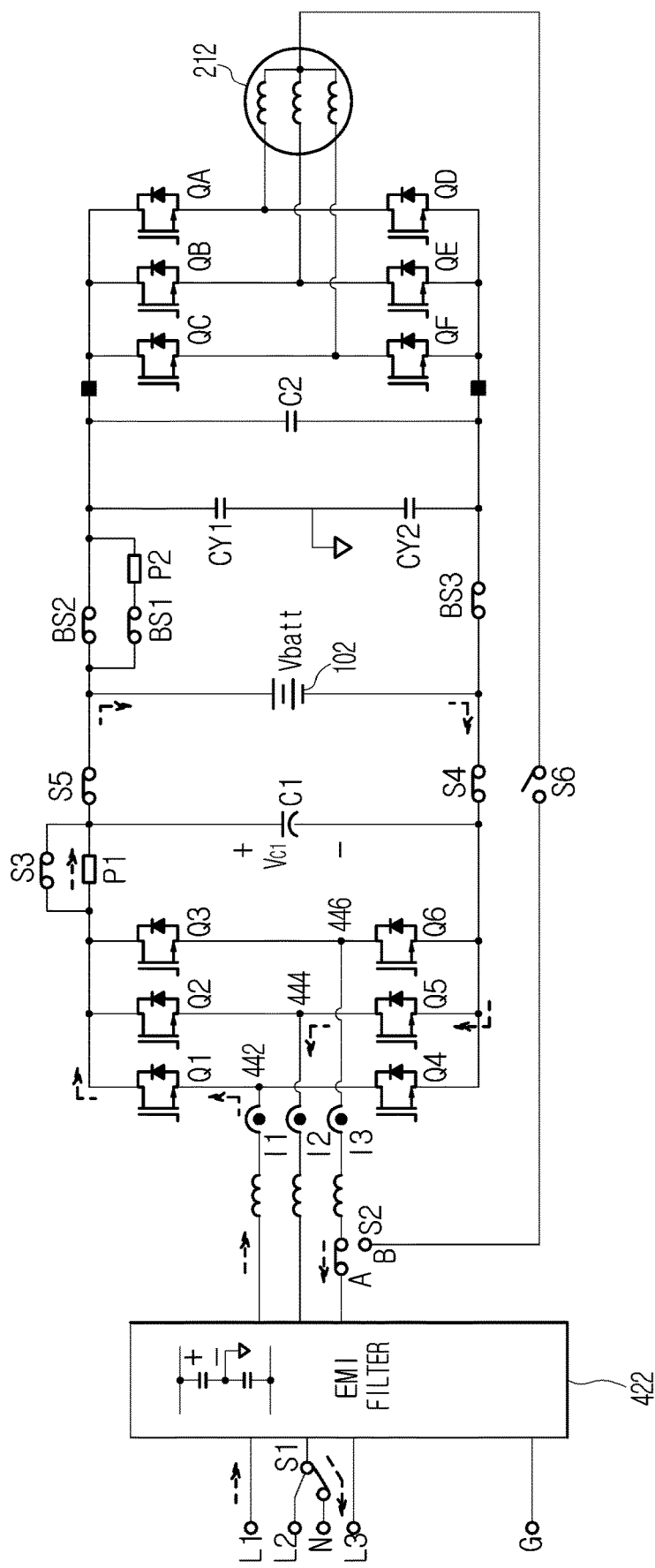

FIGS. 12 and 13 are views illustrating on/off combinations of the switch network coping with a single-phase asymmetrical power source for use in North America. Specifically, FIG. 12 is a view illustrating a method for controlling the switch network when a peak value of the voltage (Vc1) of the capacitor C1 is much lower than the charge request voltage (Vbatt) of the high-voltage battery 102. FIG. 13 is a view illustrating a method for controlling the switch network when a peak value of the voltage (Vc1) of the capacitor C1 is lower than the charge request voltage (Vbatt) of the high-voltage battery 102.

FIG. 6 is a view illustrating on/off combinations of the switch network coping with a bi-phase symmetrical power source for use in North America. Specifically, FIG. 6 is a view illustrating a method for controlling the switch network when the peak voltage of the voltage (Vc1) of the capacitor C1 is higher than the charge request voltage (Vbatt) of the high-voltage battery 102.

In FIG. 6, the on/off combinations of the respective switches S1, S2, S3, S4, S5, S6, BS1, BS2, and BS3 for use in the switch network are as follows.

S1: N, S2: B, S3: ON, S4: ON, S5: OFF, S6: ON
BS1: ON, BS2: ON, BS3: ON

The switch S1 may be controlled to connect the neutral line N to the EMI filter 422, such that bi-phase symmetric AC power may be input to the electric vehicle through the AC power input line L1 and the neutral line N. The switch S2 may be connected to a node B, and the switch S6 may be turned on. As a result, the third leg 446 of the boost power factor corrector 414 and the neutral point of the motor 212 may be electrically turned on.

In addition, the switching elements Q1, Q3, and Q5 of the boost power factor corrector 414 and the switching element QB of the inverter 206 may be turned on.

By the above-mentioned on/off combinations of the switch network, the capacitor C1 may be charged along a path denoted by a dotted arrow of FIG. 6. A charge voltage of the capacitor C1 may charge the high-voltage battery 102 through the motor 212 and the inverter 206 along a path denoted by a solid arrow of FIG. 6. The reason why the operation for charging the high-voltage battery 102 by the charging voltage of the capacitor C1 is performed is that a peak voltage of the voltage (Vc1) of the capacitor C1 is higher than the charge request voltage (Vbatt) of the high-voltage battery 102.

Since a single-phase full-bridge-inverter-type boost power factor corrector, a buck converter mode, and a motor/inverter LC filter are implemented by the above-mentioned on/off combinations of the switch network, the implementation result may cope with the bi-phase symmetric power source used in North America.

FIG. 7 is a view illustrating on/off combinations of the switch network coping with a bi-phase symmetrical power source for use in North America. Specifically, FIG. 7 is a view illustrating a method for controlling the switch network when the peak voltage of the voltage (Vc1) of the capacitor C1 is lower than the charge request voltage (Vbatt) of the high-voltage battery 102.

In FIG. 7, the on/off combinations of the respective switches S1, S2, S3, S4, S5, S6, BS1, BS2, and BS3 for use in the switch network are as follows.

S1: N, S2: B, S3: ON, S4: ON, S5: ON, S6: OFF
BS1: ON, BS2: ON, BS3: ON

The switch S1 may be controlled to connect the neutral line N to the EMI filter 422, such that bi-phase symmetric AC power may be input to the electric vehicle through the AC power input line L1 and the neutral line N. The switch S2 may be connected to the node B, and the switch S6 may be turned off. As a result, the third leg 446 of the boost power factor corrector 414 and the neutral point of the motor 212 may be electrically isolated from each other.

In addition, the switching elements Q1 and Q5 of the boost power factor corrector 414 may be turned on.

By the above-mentioned on/off combinations of the switch network, the high-voltage battery 102 may be charged along a path denoted by a dotted arrow of FIG. 7. The reason why the operation for charging the high-voltage battery 102 by the bi-phase symmetric AC power received through the EMI filter 422 is performed is that the peak voltage of the voltage (Vc1) of the capacitor C1 is lower than the charge request voltage (Vbatt) of the high-voltage battery 102. As a result, the switch S6 is turned off in a manner that the third leg 446 of the boost power factor corrector 414 and the neutral point of the motor 212 are electrically isolated from other, such that the bi-phase symmetric AC power received through the EMI filter 422 may directly charge the high-voltage battery 102.

Since a single-phase full-bridge-inverter-type boost power factor corrector is implemented by the above-mentioned on/off combinations of the switch network, the implementation result may cope with the bi-phase symmetric power source used in North America.

FIG. 8 is a view illustrating on/off combinations of the switch network coping with a three-phase symmetrical power source for use in Europe. Specifically, FIG. 8 is a view illustrating a method for controlling the switch network when the peak voltage of the voltage (Vc1) of the capacitor C1 is higher than the charge request voltage (Vbatt) of the high-voltage battery 102.

In FIG. 8, the on/off combinations of the respective switches S1, S2, S3, S4, S5, S6, BS1, BS2, and BS3 for use in the switch network are as follows.

S1: L2, S2: B, S3: ON, S4: ON, S5: OFF, S6: ON
BS1: ON, BS2: ON, BS3: ON

The switch S1 may be turned off, such that three-phase symmetric AC power may be input to the electric vehicle through the AC power input line L1 and the other AC power input line L2. The switch S2 may be connected to the node B, and the switch S6 may be turned on. As a result, the third leg 446 of the boost power factor corrector 414 and the neutral point of the motor 212 may be electrically turned on.

In addition, the switching elements Q1, Q3, and Q5 of the boost power factor corrector 414 and the switching element QB of the inverter 206 may be turned on.

By the above-mentioned on/off combinations of the switch network, the capacitor C1 may be charged along a path denoted by a dotted arrow of FIG. 8. The charge voltage of the capacitor C1 may charge the high-voltage battery 102 through the motor 212 and the inverter 206 along a path denoted by a solid arrow of FIG. 8. The reason why the operation for charging the high-voltage battery 102 by the charge voltage of the capacitor C1 is performed is that the peak voltage of the voltage (Vc1) of the capacitor C1 is higher than the charge request voltage (Vbatt) of the high-voltage battery 102.

By the above-mentioned on/off combinations of the switch network, the three-phase boost power factor corrector, the buck converter mode, and the motor/inverter LC filter are implemented using a single phase-to-phase voltage (i.e., a single line-to-line voltage), such that the implementation result may cope with the three-phase symmetric power source used in Europe.

FIG. 9 is a view illustrating on/off combinations of the switch network coping with a three-phase symmetrical power source for use in Europe. Specifically, FIG. 9 is a view illustrating a method for controlling the switch network when the peak voltage of the voltage (Vc1) of the capacitor C1 is lower than the charge request voltage (Vbatt) of the high-voltage battery 102.

In FIG. 9, the on/off combinations of the respective switches S1, S2, S3, S4, S5, S6, BS1, BS2, and BS3 for use in the switch network are as follows.

S1: L2, S2: A, S3: ON, S4: ON, S5: ON, S6: ON or OFF
BS1: ON, BS2: ON, BS3: ON

The switch S1 may be turned off and the switch S2 may be connected to the node A, such that the ON or OFF operation of the switch S6 may not affect circuit operation.

In addition, the switching elements Q1 and Q6 of the boost power factor corrector 414 may be turned on.

By the above-mentioned on/off combinations of the switch network, the high-voltage battery 102 may be charged along a path denoted by a dotted arrow of FIG. 9. The reason why the operation for charging the high-voltage battery 102 by the three-phase symmetric AC power received through the EMI filter 422 is performed is that the peak voltage of the voltage (Vc1) of the capacitor C1 is lower than the charge request voltage (Vbatt) of the high-voltage battery 102. As a result, the switch S2 is connected to the contact point B in a manner that the third leg 446 of the boost power factor corrector 414 is electrically connected to the AC power input line L3, such that the three-phase symmetric AC power received through the EMI filter 422 may directly charge the high-voltage battery 102.

By the above-mentioned on/off combinations of the switch network, the three-phase boost power factor corrector is implemented, such that the implementation result may cope with the three-phase symmetric power source used in Europe.

FIG. 10 is a view illustrating on/off combinations of the switch network coping with a single-phase asymmetrical power source for use in Korea and Europe. Specifically, FIG. 10 is a view illustrating a method for controlling the switch network when the peak voltage of the voltage (Vc1) of the capacitor C1 is higher than the charge request voltage (Vbatt) of the high-voltage battery 102.

In FIG. 10, the on/off combinations of the respective switches S1, S2, S3, S4, S5, S6, BS1, BS2, and BS3 for use in the switch network are as follows.

S1: N, S2: B, S3: ON, S4: ON, S5: OFF, S6: ON
BS1: ON, BS2: ON, BS3: ON

The switch S1 may be controlled to connect the neutral line N to the EMI filter 422, such that single-phase asymmetric AC power may be input to the electric vehicle through the AC power input line L1 and the neutral line N. The switch S2 may be connected to the node B, and the switch S6 may be turned on. As a result, the third leg 446 of the boost power factor corrector 414 and the neutral point of the motor 212 may be electrically turned on.

In addition, the switching elements Q1, Q3, and Q5 of the boost power factor corrector 414 and the switching element QB of the inverter 206 may be turned on.

By the above-mentioned on/off combinations of the switch network, the capacitor C1 may be charged along a path denoted by a dotted arrow of FIG. 10. The charge voltage of the capacitor C1 may charge the high-voltage battery 102 through the motor 212 and the inverter 206 along a path denoted by a solid arrow of FIG. 10. The reason why the operation for charging the high-voltage battery 102 by the charge voltage of the capacitor C1 is performed is that the peak voltage of the voltage (Vc1) of the capacitor C1 is higher than the charge request voltage (Vbatt) of the high-voltage battery 102.

By the above-mentioned on/off combinations of the switch network, the single-phase full-bridge-inverter-type boost power factor corrector, the buck converter mode, and the motor/inverter LC filter are implemented, such that the implementation result may cope with the single-phase asymmetric power source used in Korea and Europe.

FIG. 11 is a view illustrating on/off combinations of the switch network coping with single-phase asymmetrical power source for use in Korea and Europe. Specifically, FIG. 11 is a view illustrating a method for controlling the switch network when the peak voltage of the voltage (Vc1) of the capacitor C1 is lower than the charge request voltage (Vbatt) of the high-voltage battery 102.

In FIG. 11, the on/off combinations of the respective switches S1, S2, S3, S4, S5, S6, BS1, BS2, and BS3 for use in the switch network are as follows.

S1: N, S2: B, S3: ON, S4: ON, S5: ON, S6: OFF
BS1: ON, BS2: ON, BS3: ON

The switch S1 may be controlled to connect the neutral line N to the EMI filter 422, such that bi-phase symmetric AC power may be input to the electric vehicle through the AC power input line L1 and the neutral line N. The switch S2 may be connected to the node B, and the switch S6 may be turned off. As a result, the third leg 446 of the boost power factor corrector 414 and the neutral point of the motor 212 may be electrically isolated from each other.

In addition, the switching elements Q1 and Q5 of the boost power factor corrector 414 may be turned on.

By the above-mentioned on/off combinations of the switch network, the high-voltage battery 102 may be charged along a path denoted by a dotted arrow of FIG. 11. The reason why the operation for charging the high-voltage battery 102 by the bi-phase symmetric AC power received through the EMI filter 422 is performed is that the peak voltage of the voltage (Vc1) of the capacitor C1 is lower than the charge request voltage (Vbatt) of the high-voltage battery 102. As a result, the switch S6 is turned off in a manner that the third leg 446 of the boost power factor corrector 414 and the neutral point of the motor 212 are electrically isolated from other, such that the bi-phase symmetric AC power received through the EMI filter 422 may directly charge the high-voltage battery 102.

By the above-mentioned on/off combinations of the switch network, the single-phase full-bridge-inverter-type boost power factor corrector is implemented, such that the implementation result may cope with the single-phase symmetric power source used in Korea and Europe.

FIG. 12 is a view illustrating on/off combinations of the switch network coping with single-phase asymmetrical power source for use in North America. Specifically, FIG. 12 is a view illustrating a method for controlling the switch network when the peak voltage of the voltage (Vc1) of the capacitor C1 is much lower than the charge request voltage (Vbatt) of the high-voltage battery 102.

In FIG. 12, the on/off combinations of the respective switches S1, S2, S3, S4, S5, S6, BS1, BS2, and BS3 for use in the switch network are as follows.

S1: N, S2: B, S3: ON, S4: ON, S5: OFF, S6: ON
BS1: ON, BS2: ON, BS3: ON

The switch S1 may be controlled to connect the neutral line N to the EMI filter 422, such that bi-phase symmetric AC power may be input to the electric vehicle through the AC power input line L1 and the neutral line N. The switch S2 may be connected to the node B, and the switch S6 may be turned on. As a result, the third leg 446 of the boost power factor corrector 414 and the neutral point of the motor 212 may be electrically turned on.

In addition, the switching elements Q1, Q3, and Q5 of the boost power factor corrector 414 and the switching element QB of the inverter 206 may be turned on.

By the above-mentioned on/off combinations of the switch network, the capacitor C1 may be charged along a path denoted by a dotted arrow of FIG. 12. The charge voltage of the capacitor C1 may charge the high-voltage battery 102 through the motor 212 and the inverter 206 along a path denoted by a solid arrow of FIG. 12. The reason why the operation for charging the high-voltage battery 102 by the charge voltage of the capacitor C1 is performed is that the peak voltage of the voltage (Vc1) of the capacitor C1 is lower than the charge request voltage (Vbatt) of the high-voltage battery 102.

By the above-mentioned on/off combinations of the switch network, the single-phase full-bridge-inverter-type boost power factor corrector and a motor/inverter boost mode are implemented, such that the implementation result may cope with the single-phase asymmetric power source used in North America.

FIG. 13 is a view illustrating on/off combinations of the switch network coping with single-phase asymmetrical power source for use in North America. Specifically, FIG. 13 is a view illustrating a method for controlling the switch network when the peak voltage of the voltage (Vc1) of the capacitor C1 is lower than the charge request voltage (Vbatt) of the high-voltage battery 102.

In FIG. 13, the on/off combinations of the respective switches S1, S2, S3, S4, S5, S6, BS1, BS2, and BS3 for use in the switch network are as follows.

S1: N, S2: B, S3: ON, S4: ON, S5: ON, S6: OFF
BS1: ON, BS2: ON, BS3: ON

The switch S1 may be controlled to connect the neutral line N to the EMI filter 422, such that bi-phase symmetric AC power may be input to the electric vehicle through the AC power input line L1 and the neutral line N. The switch S2 may be connected to the node B, and the switch S6 may be turned off. As a result, the third leg 446 of the boost power factor corrector 414 and the neutral point of the motor 212 may be electrically isolated from each other.

In addition, the switching elements Q1 and Q5 of the boost power factor corrector 414 may be turned on.

By the above-mentioned on/off combinations of the switch network, the high-voltage battery 102 may be charged along a path denoted by a dotted arrow of FIG. 13. The reason why the operation for charging the high-voltage battery 102 by the bi-phase symmetric AC power received through the EMI filter 422 is performed is that the peak voltage of the voltage (Vc1) of the capacitor C1 is lower than the charge request voltage (Vbatt) of the high-voltage battery 102. As a result, the switch S6 is turned off in a manner that the third leg 446 of the boost power factor corrector 414 and the neutral point of the motor 212 are electrically isolated from other, such that the bi-phase symmetric AC power received through the EMI filter 422 may directly charge the high-voltage battery 102.

By the above-mentioned on/off combinations of the switch network, the single-phase full-bridge-inverter-type boost power factor corrector is implemented, such that the implementation result may cope with the single-phase asymmetric power source used in North America.

As is apparent from the above description, the charging apparatus for the electric vehicle in the forms of the present disclosure has a small and simple structure, and charges a battery of the electric vehicle upon receiving from various kinds of power sources.

Although a few forms of the present disclosure have been shown and described, it would be appreciated by those skilled in the art that changes may be made in these forms without departing from the principles and spirit of the present disclosure.

What is claimed is:

1. A charging apparatus for an electric vehicle, the charging apparatus comprising:
   a motor configured to generate a power to drive the electric vehicle;
   an inverter configured to supply a power to the motor;
   an alternating current (AC) power input stage configured to receive an AC input power from one of a single-phase AC power or a multi-phase AC power;
   a power factor corrector having a single three-leg half bridge circuit configured to receive the AC input power through the AC power input stage;
   a link capacitor configured to be charged through at least one of combinations of the power factor corrector, the motor, and the inverter;
   a switch network including a first switch and a second switch, wherein the first switch is configured to connect an AC power input line or a neutral line of the AC power input stage to the power factor corrector, and the second switch is configured to selectively connect the AC power input stage to the power factor corrector, the link capacitor, the motor, or the inverter; and
   a controller configured to control the power factor corrector and the switch network based on a condition of the AC input power received through the AC power input stage.

2. The charging apparatus according to claim 1, wherein the first switch is provided to the AC power input stage, and is turned on or turned off so as to cope with a multi-phase condition or a single-phase condition of the AC input power.

3. The charging apparatus according to claim 2, wherein the switch network further includes:
   a third switch having one end connected to a neutral point of the motor.

4. The charging apparatus according to claim 3, wherein the switch network further includes:
   a fourth switch configured to connect the power factor corrector to the AC power input stage or the third switch.

5. The charging apparatus according to claim 4, wherein the switch network further includes:
   a fifth switch disposed between the power factor corrector and the link capacitor.

6. The charging apparatus according to claim 5, wherein the switch network further includes:
   a sixth switch disposed between a first end and a second end of the link capacitor; and a seventh switch disposed between a first end and a second end of a converter.

7. The charging apparatus according to claim 6, wherein:
a first leg of the power factor corrector is connected to a first AC power input line of the AC power input stage;
a second leg of the power factor corrector is connected to a second AC power input line or a neutral line of the AC power input stage through the first switch; and
a third leg of the power factor corrector is connected to a third AC power input line of the AC power input stage or the third switch through the fourth switch.

8. The charging apparatus according to claim 1, wherein the condition of the AC input power includes a multi-phase condition and a single-phase condition of the AC input power.

9. The charging apparatus according to claim 1, wherein the condition of the AC input power includes a symmetric power condition and an asymmetric power condition of the AC input power.

10. A charging apparatus for an electric vehicle, the charging apparatus comprising:
a motor configured to generate a power to drive the electric vehicle;
an inverter configured to supply a power to the motor;
an alternating current (AC) power input stage configured to receive an AC input power from one of a single-phase AC power or a multi-phase AC power;
a power factor corrector having a single three-leg half bridge circuit configured to receive the AC input power through the AC power input stage;
a link capacitor to be charged through at least one of combinations of the power factor corrector, the motor, and the inverter;
a switch network including a first switch and a second switch, wherein the first switch is configured to connect an AC power input line or a neutral line of the AC power input stage to the power factor corrector, and the second switch is configured to selectively connect the AC power input stage to the power factor corrector, the link capacitor, the motor, or the inverter; and
a controller configured to control the power factor corrector and the switch network based on a condition of the AC input power received through the AC power input stage,
wherein the switch network further includes:
a third switch having one end connected to a neutral point of the motor; and
a fourth switch configured to connect the power factor corrector to the AC power input stage or the third switch.

11. The charging apparatus according to claim 10, wherein the first switch is provided to the AC power input stage, and is turned on or turned off so as to cope with a multi-phase condition or a single-phase condition of the AC input power.

12. The charging apparatus according to claim 11, wherein the switch network further includes:
a fifth switch disposed between the power factor corrector and the link capacitor.

13. The charging apparatus according to claim 12, wherein the switch network further includes:
a sixth switch disposed between a first end and a second end of the link capacitor; and
a seventh switch disposed between a first end and a second end of a converter.

14. The charging apparatus according to claim 13, wherein:

a first leg of the power factor corrector is connected to a first AC power input line of the AC power input stage;
a second leg of the power factor corrector is connected to a second AC power input line or a neutral line of the AC power input stage through the first switch; and
a third leg of the power factor corrector is connected to a third AC power input line of the AC power input stage or the third switch through the fourth switch.

15. The charging apparatus according to claim 10, wherein the condition of the AC input power includes a multi-phase condition and a single-phase condition of the AC input power.

16. The charging apparatus according to claim 10, wherein the condition of the AC input power includes a symmetric power condition and an asymmetric power condition of the AC input power.

17. A charging apparatus for an electric vehicle, the charging apparatus comprising:
a motor configured to generate a power to drive the electric vehicle;
an inverter configured to supply a power to the motor;
an alternating current (AC) power input stage configured to receive at least one AC input power from one of a single-phase AC power or a multi-phase AC power;
a power factor corrector having a single three-leg half bridge circuit configured to receive the at least one AC input power through the AC power input stage;
a link capacitor to be charged through at least one of combinations of the power factor corrector, the motor, and the inverter;
a switch network including a first switch and a second switch, wherein the first switch is configured to connect an AC power input line or a neutral line of the AC power input stage to the power factor corrector, and the second switch is configured to selectively connect the AC power input stage to the power factor corrector, the link capacitor, the motor, or the inverter; and
a controller configured to control the power factor corrector and the switch network based on a condition of the at least one AC input power received through the AC power input stage,
wherein the switch network further includes:
a third switch including one end connected to a neutral point of the motor;
a fourth switch configured to connect the power factor corrector to the AC power input stage or the third switch;
a fifth switch disposed between the power factor corrector and the link capacitor;
a sixth switch disposed between a first end and a second end of the link capacitor; and
a seventh switch disposed between a first end and a second end of a converter.

18. The charging apparatus according to claim 17, wherein the first switch is provided to the AC power input stage, and is turned on or turned off so as to cope with a multi-phase condition or a single-phase condition of the received at least one AC input power.

19. The charging apparatus according to claim 18, wherein:
a first leg of the power factor corrector is connected to a first AC power input line of the AC power input stage;
a second leg of the power factor corrector is connected to a second AC power input line or a neutral line of the AC power input stage through the first switch; and a third leg of the power factor corrector is connected to a third AC power input line of the AC power input stage or the third switch through the fourth switch.

20. The charging apparatus according to claim 18, wherein the condition of the received AC input power includes a multi-phase condition and a single-phase condition of the at least one AC input power received through the AC power input stage.

21. The charging apparatus according to claim 18, wherein the condition of the received AC input power includes a symmetric power condition and an asymmetric power condition of the at least one AC input power received through the AC power input stage.

* * * * *